(12) United States Patent
Havstad et al.

(10) Patent No.: US 6,388,785 B2
(45) Date of Patent: May 14, 2002

(54) OPTICAL COMPENSATION FOR DISPERSION-INDUCED POWER FADING IN OPTICAL TRANSMISSION OF DOUBLE-SIDEBAND SIGNALS

(75) Inventors: Steven A. Havstad, Fremont; Asaf B. Sahin, Los Angeles; Olaf H. Adamczyk, Santa Monica; Yong Xie, Fremont; Alan E. Willner, Los Angeles, all of CA (US)

(73) Assignee: University of Southern California, Los Angeles, CA (US)

(*) Notice: Subject to any disclaimer, the term of this patent is extended or adjusted under 35 U.S.C. 154(b) by 0 days.

(21) Appl. No.: 09/780,604

(22) Filed: Feb. 8, 2001

Related U.S. Application Data
(60) Provisional application No. 60/181,119, filed on Feb. 8, 2000.

(51) Int. Cl.[7] ............... H04B 10/00; H04B 10/18
(52) U.S. Cl. ............... 359/161; 359/188; 359/130
(58) Field of Search ............... 359/161, 188, 359/130; 385/37

(56) References Cited

U.S. PATENT DOCUMENTS

| | | | |
|---|---|---|---|
| 5,048,909 | A | 9/1991 | Henry et al. |
| 5,428,697 | A | 6/1995 | Dolfi et al. |
| 5,828,681 | A | 10/1998 | Epworth |
| 5,850,301 | A | 12/1998 | Mizuochi et al. |
| 5,943,151 | A | 8/1999 | Grasso et al. |
| 5,982,963 | A | 11/1999 | Feng et al. |
| 6,137,604 | A | 10/2000 | Bergano |
| 6,178,021 | B1 | 1/2001 | Bruyere et al. |

*Primary Examiner*—Jason Chan
*Assistant Examiner*—Agustin Bello
(74) *Attorney, Agent, or Firm*—Fish & Richardson P.C.

(57) ABSTRACT

Techniques and devices for compensating dispersion-induced power fading in a double-sideband optical signal based on a tunable optical dispersion element.

19 Claims, 8 Drawing Sheets

* Lengths of the upper and lower arms are offset by $\pi/2$ to eliminate ripple in the received RF power

- Received subcarrier power after compensation using our module is flat to within 1 dB

"OPTICAL COMPENSATION FOR DISPERSION-INDUCED POWER FADING IN OPTICAL TRANSMISSION OF DOUBLE-SIDEBAND SIGNALS"

This application claims the benefit of U.S. Provisional Application No. 60/181,119, filed Feb. 8, 2000.

TECHNICAL FIELD

This application relates to optical signal transmission and detection over dispersive optical links such as optical fibers.

BACKGROUND

An optical wave at an optical carrier frequency $f_c$ may be modulated at a subcarrier frequency $f_{RF}$ to produce two modulation sideband signals at frequencies of $(f_c-f_{RF})$ and $(f_c+f_{RF})$, respectively. The sideband signals may be used to carry information for transmission over an optical link or a network of optical links. The optical media in an optical link, e.g., optical fibers, may exhibit chromatic dispersion where spectral components at different frequencies in an optical signal can travel at different group velocities. Therefore, in optical systems where double-sideband signals are used, the two sideband signals at different frequencies of $(f_c-f_{RF})$ and $(f_c+f_{RF})$ in an optical signal may be delayed relative to each other.

Figure 1:
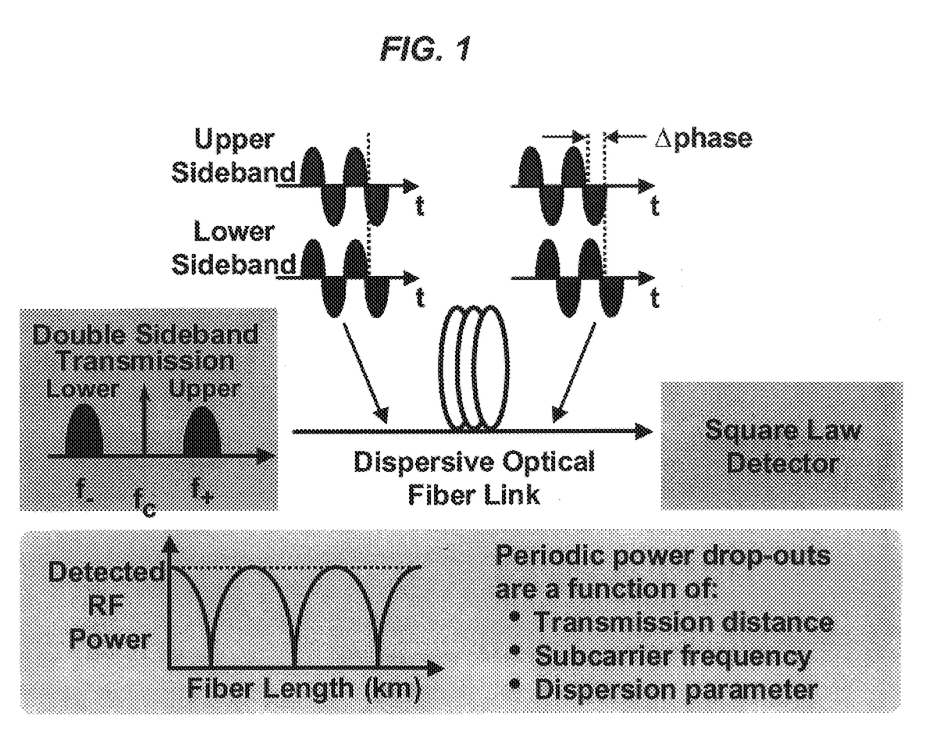
FIG. 1 illustrates the distance-dependent power fading in a double-sideband optical signal caused by the chromatic dispersion in an optical transmission medium.

One consequence of this delay between the sideband signals in the double-sideband optical signal is the fading or decay of the received subcarrier power, which varies as a function of the subcarrier frequency, the transmission distance in the fiber, and accumulated dispersion:

$$P_{cl,f} \times \cos^2\left(\frac{\varphi_1 + \varphi_2}{2}\right) = \cos^2\left[\pi cLD\left(\frac{f}{f_c}\right)^2\right]$$

where $\phi_1$, and $\phi_2$ are respectively the phases of the modulation sidebands at $(f_c-f_{RF})$ and $(f_c+f_{RF})$ relative to the optical carrier at $f_c$, c is the speed of light, L is the transmission distance, D is the dispersion parameter of the fiber in the link, and f is the subcarrier modulation frequency $f_{RF}$. FIG. 1 illustrates this dispersion-induced power fading effect in a double-sideband optical signal.

This signal fading is undesirable in many applications because it can seriously deteriorate the detection of the optical signals. In some optical networks where the actual optical paths for transmitting signals may be reconfigurable, such power fading may dynamically change with the transmission distance. Therefore, it may be desirable to provide distance-independent power fading compensation in some microwave- and millimeter-wave-based optical systems that use double-sideband signals to transmit information.

SUMMARY

The power fading compensation according to one embodiment includes optically splitting a double-sideband optical signal into a first optical signal in a first optical path and a second optical signal in a second optical path and then controlling dispersion in at least one of the first and the second optical paths to produce a difference of about π between a sum of phases of the first and the second modulation sidebands relative to a phase of the optical carrier at the carrier frequency in the first optical signal, and a sum of phases of the first and the second modulation sidebands relative to a phase of the optical carrier in the second optical signal. A tunable optical dispersion element, such as a nonlinearly-chirped fiber Bragg grating, may be used to produce the desired dispersion.

DETAILED DESCRIPTION

Figure 2:
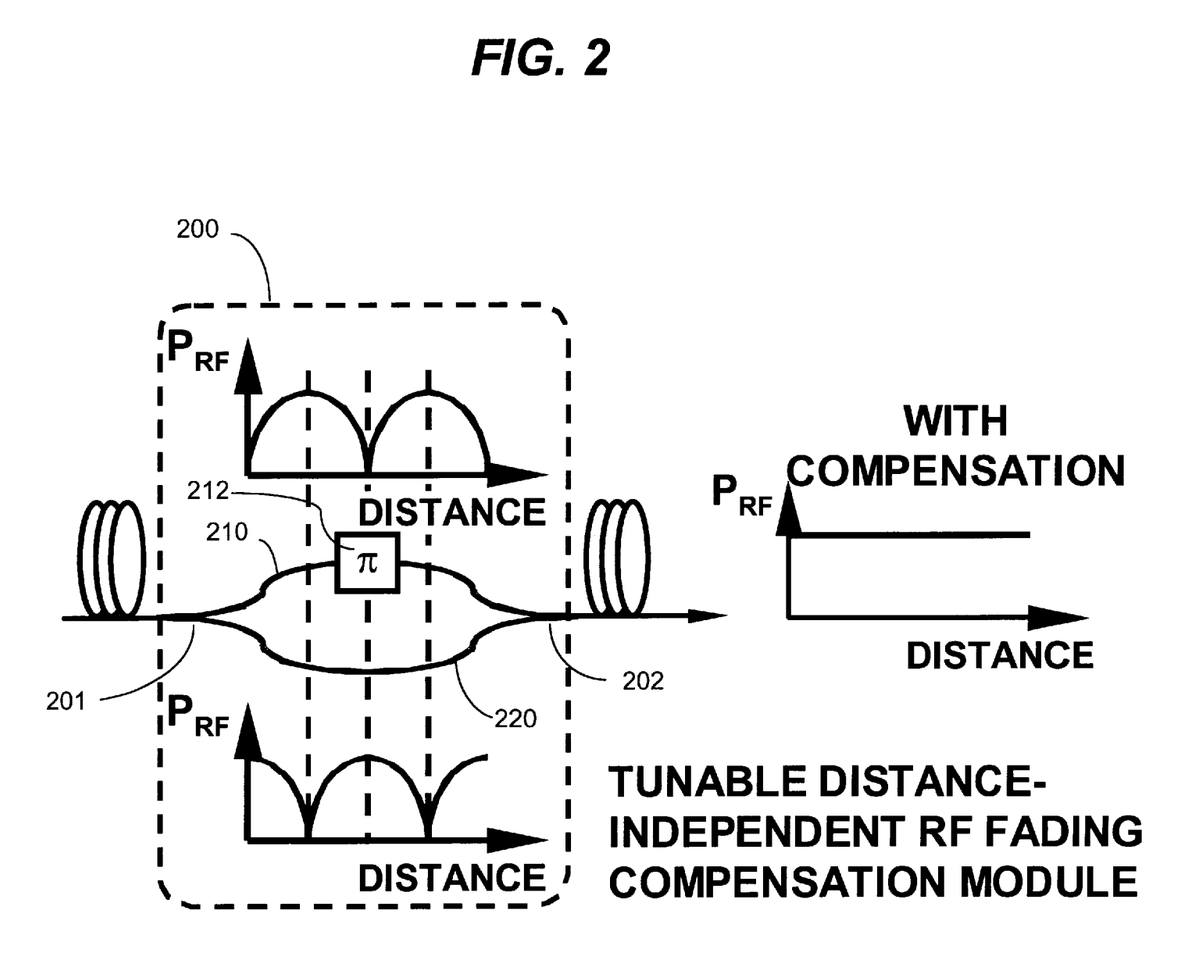
FIG. 2 illustrates one embodiment of an optical device that provides distance-independent compensation for the distance-dependent power fading in a double-sideband optical signal transmitting through a dispersive optical link.

FIG. 2 shows one embodiment of an optical device 200 that provides distance-independent compensation for the distance-dependent power fading in a double-sideband optical signal transmitting through a dispersive optical link. The optical signal at the optical carrier frequency $f_c$ has two modulation sidebands at $(f_c-f_{RF})$ and $(f_c+f_{RF})$ that include the information or data to be transmitted. The subcarrier frequency $f_{RF}$ may be generally in the frequency range for the microwave and millimeter-wave frequencies, e.g., from tens of kilohertz (~$10^4$ Hz) to hundreds of gigahertz (~$10^{11}$ Hz). The device 200 uses a phase diversity configuration with two separate optical paths 210 and 222 to perform the compensation for the distance-dependent power fading.

The device 200 includes an optical input port 201 for receiving the double-sideband optical signal from the dispersive optical link and an optical output port 202 for combining the optical signals from the two paths 210 and 220 to produce the fading-compensated optical output. The input port 210 is designed to split the input signal into the two separate optical paths 210 and 220. A tunable optical dispersion element 212 is placed in one optical path, e.g., the optical path 210, to introduce different time delays for the two different frequencies of $(f_c-f_{RF})$ and $(f_c+f_{RF})$ so that the sum of the phases of the modulation sidebands in the optical path 210 relative to the phase of the optical carrier at the carrier frequency $f_c$ is shifted by π with respect to the sum of the phases of the modulation sidebands relative to the optical carrier at the carrier frequency $f_c$ in the other optical path 220. The optical dispersion element 212 may be tunable in order to produce this desired relative phase shift of π for in optical signals with different values for the modulation frequency $f_{RF}$ and the carrier frequency $f_c$.

This optical device 200 further includes a polarization control mechanism to control the polarization of light in at least one optical path so that the optical signals in the two optical paths 210 and 220 have orthogonal polarizations relative to each other at the output port 202 where the two optical paths 210 and 220 are coupled together. A polarization rotator or controller, for example, may be placed in one of the two optical paths to achieve this condition. As a result, optical signals in the two paths 210 and 220 can be combined at the output port 202 without substantial cross-talk effects that would otherwise be present due to optical coherence. Hence, an optical receiver that receives the combined optical signal from the output port 202 produces a detector output that is a sum of the individual powers of the two optical signals from the two optical paths.

The photocurrents representing the two optical signals can be written as:

$$I_g \times c_g \cos\left(\frac{\varphi_1 + \varphi_2 + \pi}{2}\right) \cos(2\pi f t + \theta_g)$$

$$I_o \times c_o \cos\left(\frac{\varphi_1 + \varphi_2}{2}\right) \cos(2\pi f t + \theta_o)$$

where $c_g$ and $c_o$ are constants representing the optical powers from the two paths 210 and 220 incident on the optical receiver at the output port 202, and $\theta_g$ and $\theta_o$ represent the relative subcarrier phases in the two paths 210 and 220. Hence, if $c_g = c_o$ and $(\theta_g - \theta_o) = \pi/2$, the total received power at the receiver will be a constant without the effects of the dispersion-induced power fading:

$$P_{cl,f} = \cos^2\left(\frac{\varphi_1 + \varphi_2}{2}\right) + \sin^2\left(\frac{\varphi_1 + \varphi_2}{2}\right) = \text{constant}$$

The condition of $c_g = c_o$ may be achieved by adjusting the optical intensity in one optical path relative to another by using an optical attenuator. The condition of $(\theta_g - \theta_o) = \pi/2$ may be achieved by controlling the relative optical path length difference of the two optical paths 210 and 220.

Notably, the operation of the device 200 is independent of the state of accumulated dispersion in the received double-sideband optical signal. Therefore, the device 200 may be deployed at any desired location in an optical link within an optical network to compensate for the distance-dependent power fading.

Figure 3:
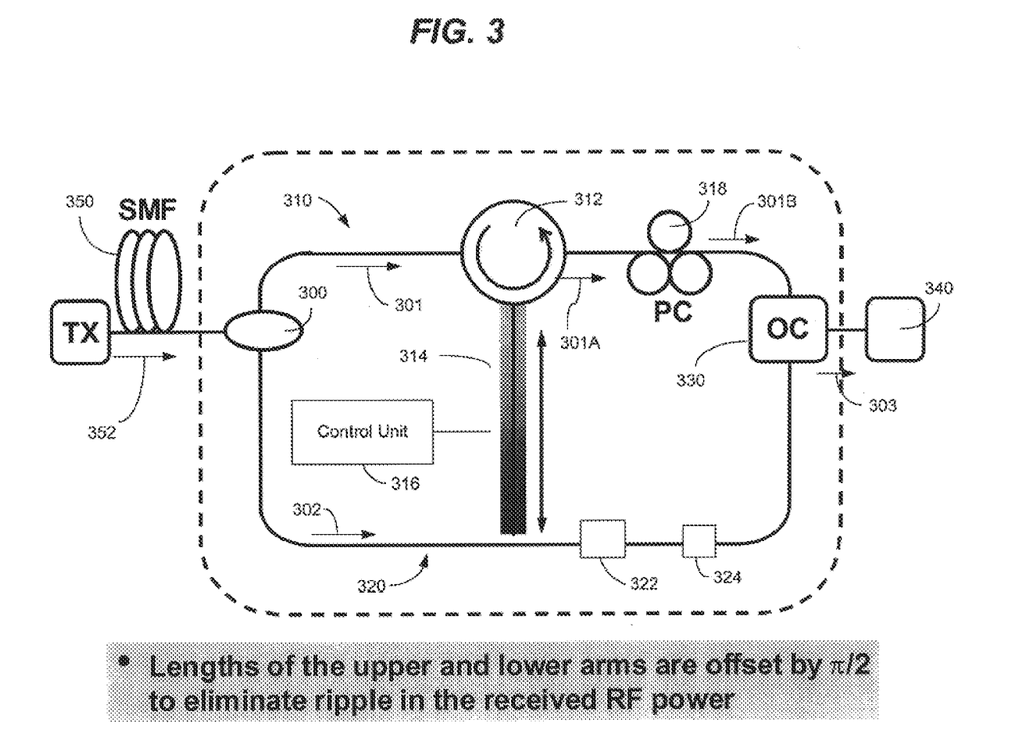
FIG. 3 shows one implementation of the optical device shown in FIG. 2.

FIG. 3 shows one exemplary optical device based on the design shown in FIG. 2 for installation in a fiber link 350 that carries a double-sideband optical signal 352. This device includes an input fiber optical coupler 300 as its input port to receive the optical signal 352. The input coupler 300 is coupled to receiving terminals of two separate fiber optical paths 310 and 320 and is operable to split the input optical signal 352 into two optical signals 301 and 302 in the fiber optical paths 310 and 320, respectively. The optical path 310 includes a tunable optical dispersion element 314 and a control unit 316 that controls the operation of the element 314. The element 314 is operable to produce different dispersions on spectral components at different wavelengths in the optical signal 301 to produce a dispersion-modified signal 301A in which the sum of the phases of the modulation sidebands relative to the phase of the optical carrier at the carrier frequency $f_c$ is shifted by $\pi$ with respect to the sum of the phases of the modulation sidebands in the optical signal 302 relative to the optical carrier at the carrier frequency $f_c$ in the optical path 320.

An output optical fiber coupler 330 is used to couple the output terminals of the fiber optical paths 310 and 320 to combine the signals 301A and 302 into an output optical signal 303. An optical polarization-rotating element 318 is implemented in either one of the optical paths 310 and 320 to make the polarizations of the signals 301A and 320 orthogonal to each other at the output coupler 330. For example, a fiber polarization controller or a 90-degree polarization rotator may be used as the element 314 and placed in the optical path 310 between the optical dispersion element 314 and the output coupler 330. The polarization of the signal 301A is rotated by 90 degrees to produce a polarization-rotated signal 301B. The signals 301B and 320 is then combined at the coupler 330 to produce the output signal 303. An optical receiver 340 may be coupled to receive the signal 303.

The optical paths 310 and 320 are designed to have different optical path lengths so that the phase associated with the path length difference at the output coupler 330 is $\pi/2$ to satisfy the condition of $(\theta_g - \theta_o) = \pi/2$. A variable optical delay element 322, such as a fiber loop with a fiber stretcher, may be placed in one optical path, e.g., 320, to adjust the phase difference $(\theta_g - \theta_o)$ under different operating conditions to maintain the condition of $(\theta_g - \theta_o) = \pi/2$. In addition, the powers the optical signals 301B and 302 in the output signal 303 should be substantially equal. Hence, an optical attenuator 324, preferably adjustable, may be placed in at least one of the optical paths 310 and 310 to satisfy this condition.

Figure 4A:
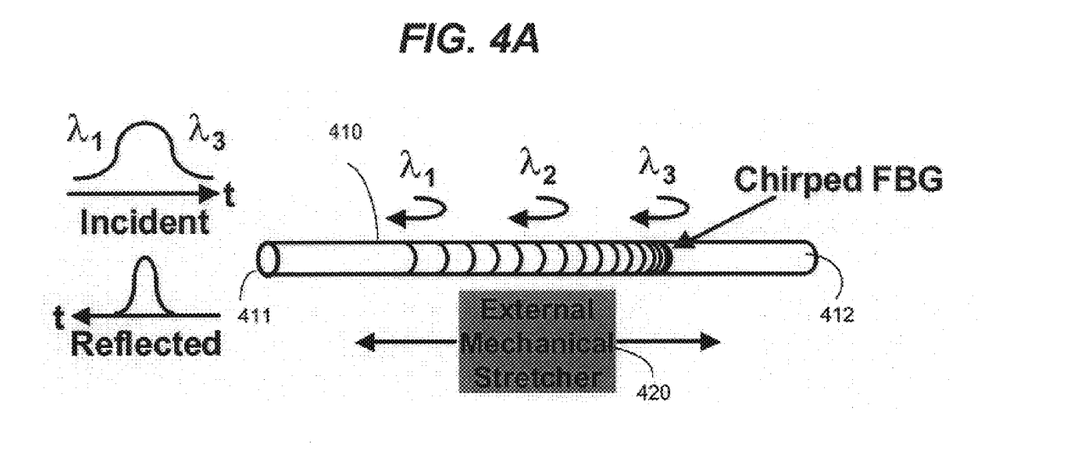
FIG. 4A shows one embodiment of a tunable optical dispersion element in the device shown in FIG. 3 where a nonlinearly-chirped fiber Bragg grating is used.

One example of the tunable dispersion element 314 is a nonlinearly-chirped fiber Bragg grating (FBG). See, U.S. Pat. No. 5,982,963 to Feng et al. Referring to FIG. 4A, the nonlinearly-chirped Bragg grating 410 is a grating that can be formed along an optical waveguide, e.g., an optical fiber, and has a grating parameter $n_{neff}(z)\Lambda(z)$ that changes nonlinearly with the position z along the fiber optic axis, where $n_{neff}(z)$ is the effective index of refraction and $\Lambda(z)$ is the period of the grating. The grating 410 has a long-wavelength end 411 and a short-wavelength end 412 where the grating parameter $n_{neff}(z)\Lambda(z)$ monotonically decreases from the end 411 to the end 412. In operation, this nonlinearly-chirped grating 410 may be used to receive an optical signal and to reflect light satisfying a Bragg condition of $\lambda(z) = 2n_{neff}(z)\Lambda(z)$ and transmits light that fails the Bragg condition. Hence, different spectral components are reflected back at different positions in the grating to produce different group delays. A Bragg reflection band centered at a center wavelength $\lambda_0$ can be generated and the bandwidth, $\Delta\lambda_{FBG}$, of the grating is determined by the chirping range of the grating parameter $n_{neff}(z)\Lambda(z)$. Either end of grating may be used depending on the type of dispersion is needed.

Figure 4B:
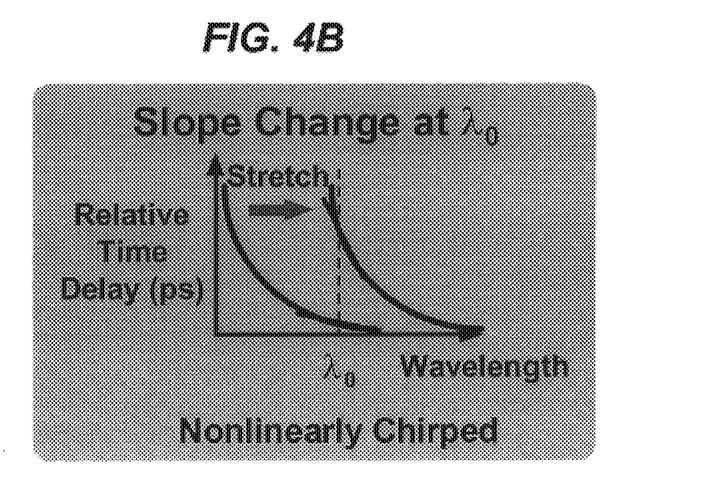
FIGS. 4B and 4C illustrate operations of the nonlinearly-chirped fiber Bragg grating in compensating for the distance-dependent power fading.

Notably, as shown in FIG. 4B, the relative group delays for different spectral components at different wavelengths are different and tunable in the nonlinearly-chirped fiber grating, that is, the grating dispersion is tunable by adjusting the grating parameter $n_{neff}(z)\Lambda(z)$. This is caused by the nonlinearity in the chirp of the grating parameter $n_{neff}(z)\Lambda(z)$. A grating control unit 420, which is part of the control unit 316 in FIG. 3, may be coupled to the grating 410 to change the grating parameter $n_{neff}(z)\Lambda(z)$ so as to shift the center wavelength $\lambda_0$ of the Bragg reflection band and tune the dispersion. This grating control unit 420 may be a fiber stretcher to control the total length of the fiber grating to adjust $\Lambda(z)$. Referring back to FIG. 3, an optical circulator 312 may be used to couple the tunable fiber grating 314 to the optical path 310 so that the signal 301 is directed to a receiving end of the grating 314 (either 411 or 412) and the reflected signal 301A is coupled into the optical path 310 towards the output coupler 330.

Figure 4C:
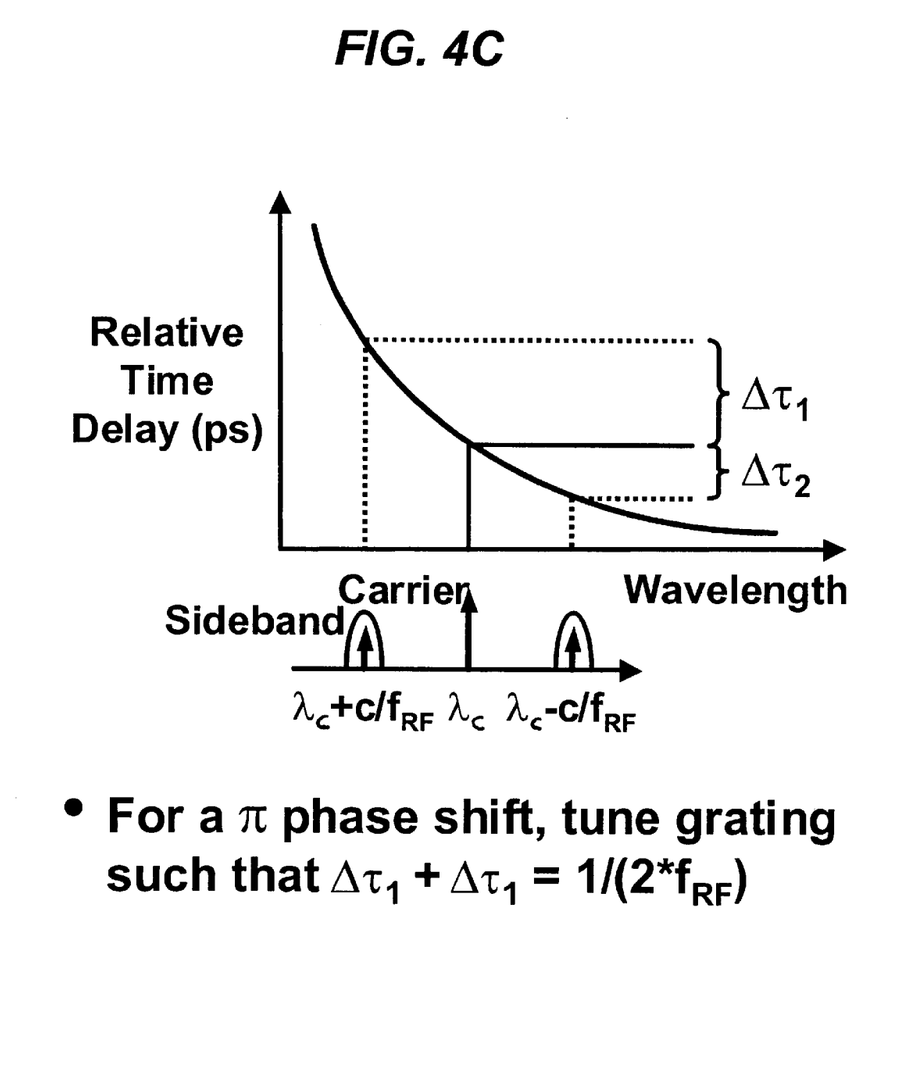

FIG. 4C illustrates the operation of the fiber grating 410 for compensating the power fading in the device in FIG. 3. In this example, the short-wavelength end 412 is used to receive the signal 301 and to produce the signal 301A in the optical path 310. Since the modulation sideband signals are at different frequencies ($f_c + f_{RF}$) and ($f_c - f_{RF}$), they are reflected at different positions in the fiber grating 410 as illustrated in FIG. 4A to produce different delays $\Delta\tau_1$ and $\Delta\tau_2$ relative to the optical carrier at the optical carrier frequency $f_c$. Such grating-induced delays are added to the relative delays $\Delta\tau'_1$ and $\Delta\tau'_2$ caused by the chromatic dispersion in the fiber link so that the total relative delays of the modulation sideband signals with respect to the optical carrier in the optical signal 301B at the output coupler 330 are $(\Delta\tau_1+\Delta\tau'_1)$ and $(\Delta\tau'_2+\Delta\tau_2)$, respectively. The sum of the relative delays in the optical signal 301B is $(\Delta\tau_1+\Delta\tau'_1)= (\Delta\tau_2+\Delta\tau'_2)=(\Delta\tau'_1+\Delta\tau'_2)+(\Delta\tau_1+\Delta\tau_2)$, where the delay of $(\Delta\tau_1+\Delta\tau_2)$ is produced by the grating 410. On the other hand, the modulation sideband signals at sideband frequencies $(f_c+f_{RF})$ and $(f_c-f_{RF})$ in the signal 302 in the optical path 320 also have the relative delays $\Delta\tau'_1$ and $\Delta\tau'_2$ respect to the optical carrier caused by the chromatic dispersion in the fiber link. Hence, the total relative delays of the modulation sideband signals with respect to the optical carrier in the optical signal 302 at the output coupler 330 are $(\Delta\tau_1+\Delta\tau'_1)$. The overall length of the fiber grating 410 is controlled so that the phase delay corresponding to the total relative delay in time, $(\Delta\tau_1+\Delta\tau_2)$, is $\pi$. If there is any additional relative delay between the sidebands and the carrier in the optical signals 301B and 302 at the output coupler 330 due to dispersion in the paths 310 and 320 that is not caused by the fiber grating 410, the grating-induced phase delay corresponding to the total relative delay $(\Delta\tau_1+\Delta\tau_2)$ may be different from $\pi$. However the operating conditions may be, the fiber grating 410 is tuned to produce a total relative delay $(\Delta\tau_1+\Delta\tau_2)$ so that, at the output coupler 330, the sum of the phases of the modulation sidebands relative to the phase of the optical carrier at the carrier frequency $f_c$ is shifted by $\pi$ with respect to the sum of the phases of the modulation sidebands in the optical signal 302 relative to the optical carrier at the carrier frequency $f_c$ in the optical path 320.

Figures 5, 6:
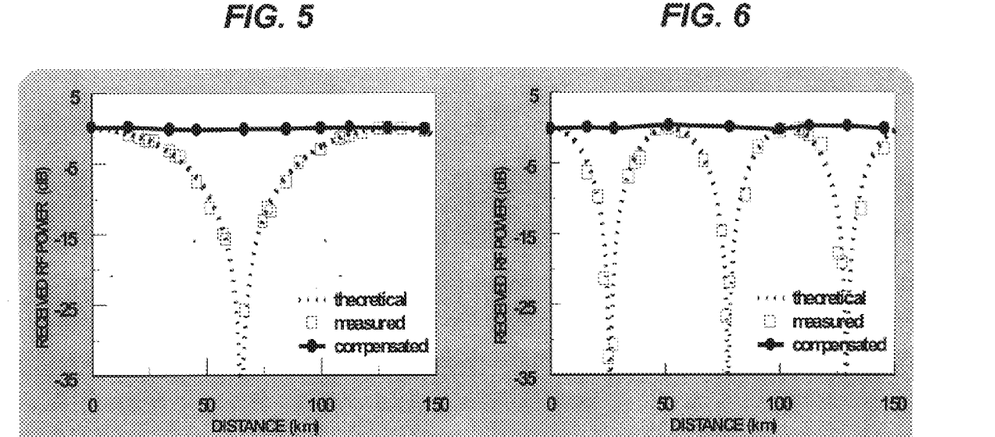
FIGS. 5, 6, and 7 show various measured signals obtained from a device based on the design shown in FIG. 3.

FIG. 5 compares magnitudes of the power fading in a double-sideband optical signal after transmission over a dispersive fiber of 150 km in length with and without the above power fading compensation. The subcarrier frequency is 8 GHz. The above compensation scheme essentially eliminates the power fading and achieves a power uniformity within 1 dB over the 150-km fiber. FIG. 6 shows the results when the subcarrier frequency is 12 GHz.

Figure 7:
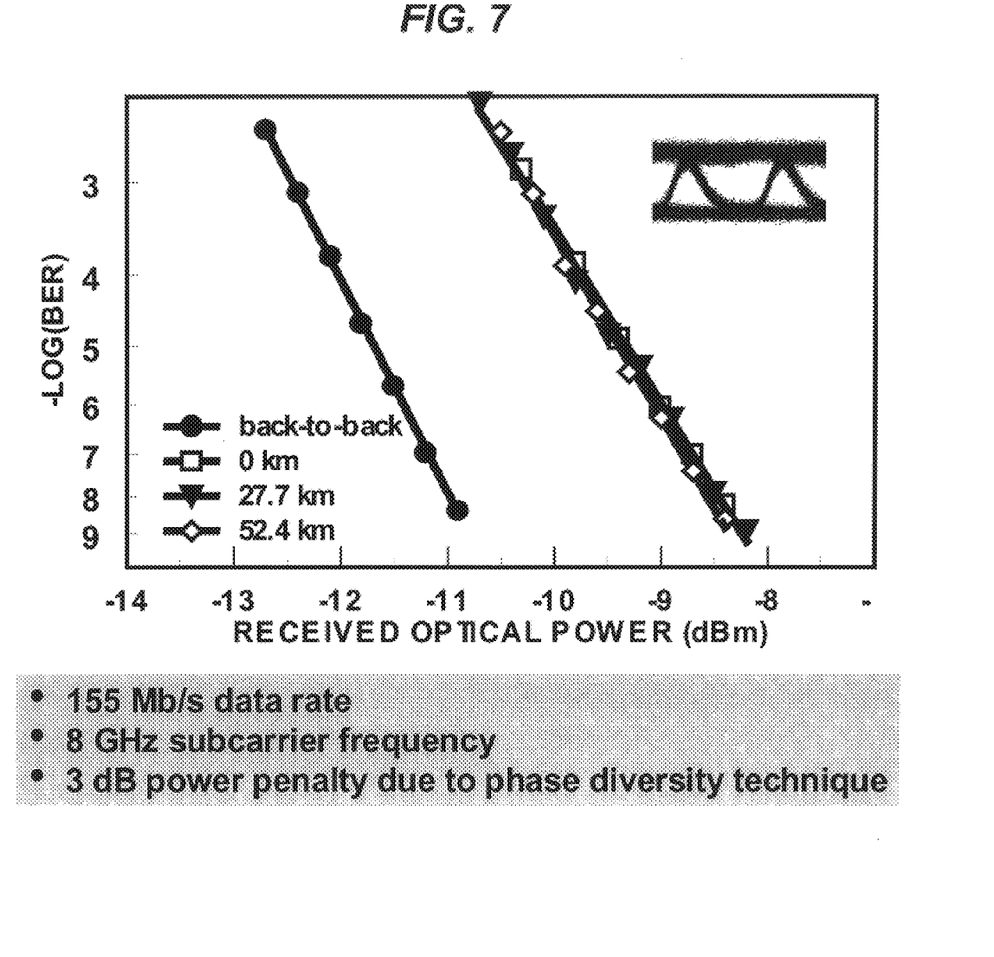

FIG. 7 further shows measured bit error rates after transmission over dispersive fibers of 27.7 km and 52.4 km in length for a double-sideband signal modulated at a subcarrier frequency of 8 GHz. The carrier is modulated to carry 155-Mb/s pseudorandom data. For the subcarrier frequency at 8 GHz, 0 km corresponds to maximum power fading in the grating path of our module, while 52.4 km corresponds to maximum power fading in the nongrating path. Thus BER performance is independent of whether the received electrical subcarrier power originated from the grating path or the nongrating path. The 3-dB optical power penalty (6-dB electrical power penalty) relative to a back-to-back BER measurement comes from optical power splitting in the device shown in FIG. 3.

The above embodiments controls and tunes the chromatic dispersion in one of the optical paths to achieve a phase shift of $\pi$ between the sum of the phases of the modulation sidebands relative to the phase of the optical carrier in one optical path and the sum of the phases of the modulation sidebands in the optical signal relative to the optical carrier in the other optical path. This may also be achieved by controlling and tuning the chromatic dispersion in both optical paths. Two separate tunable optical dispersion elements may be respectively coupled to the two optical paths. Alternatively, a single optical dispersion element may be used to control the dispersion in both optical paths.

Figure 8:
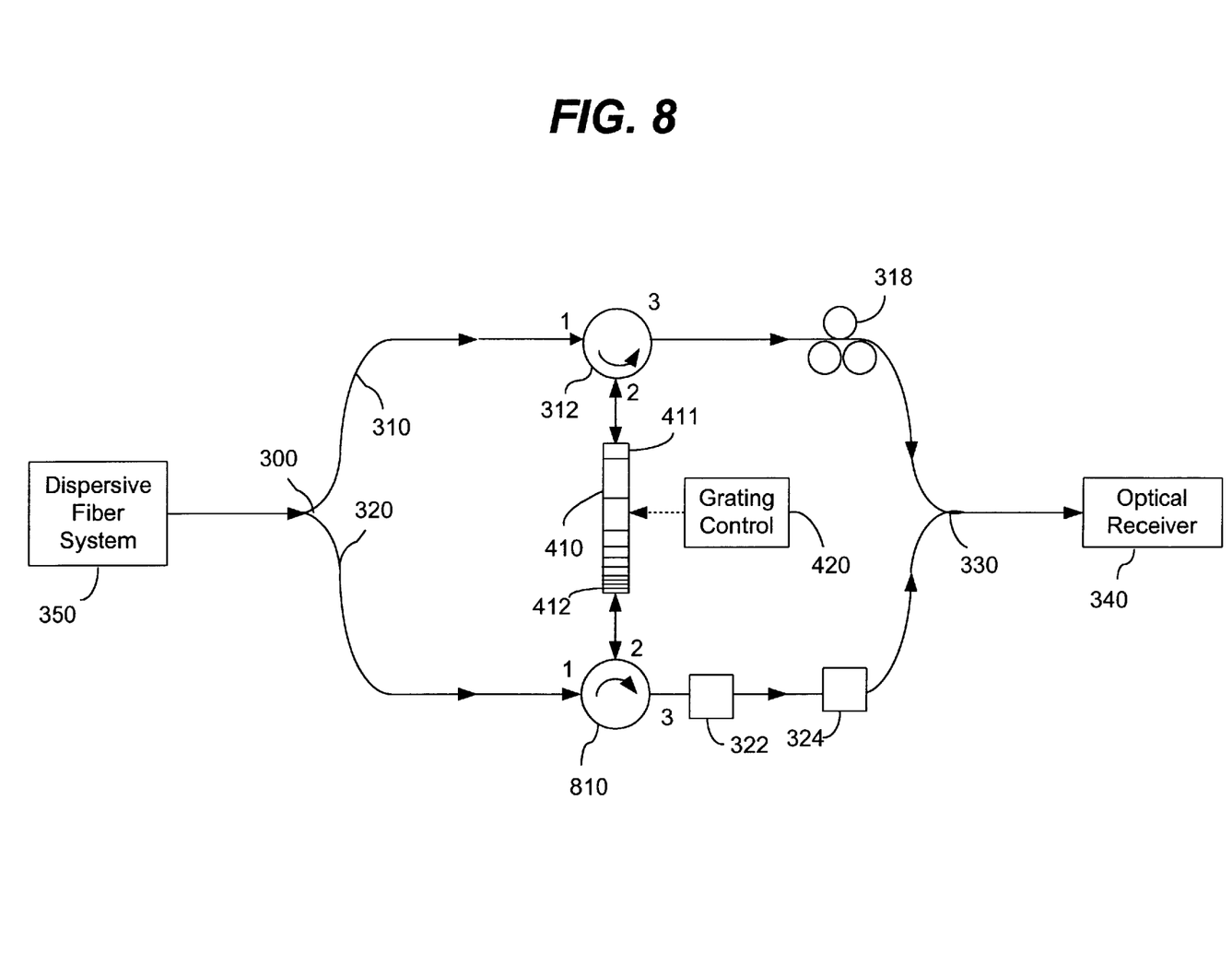
FIG. 8 shows another implementation of the optical device shown in FIG. 2.

FIG. 8 shows an implementation of the device shown in FIG. 3 where the two terminals 411 and 412 of the tunable fiber grating 410 are coupled to both optical paths 410 and 420, respectively. A second optical circulator 810 is used to couple the terminal 412 of the fiber grating 410 to the second optical path 320. Since the dispersions produced by the two terminals 411 and 422 are opposite, the fiber grating 410 can be stretched to produce only one half the $\pi$-phase shift at each terminal in order to achieve a total of phase shift of $\pi$.

Although only a few embodiments are disclosed, various modifications and enhancements may be made without departing from the following claims.

What is claimed is:

1. A device, comprising:

a first optical path having an input terminal and an output terminal, said input terminal receiving a first portion of an input optical signal at an optical carrier frequency that is modulated to have a first modulation sideband and a second modulation sideband;

a second optical path having an input terminal and an output terminal that are coupled to said input and said output terminals of said first optical path, respectively, wherein said second optical path receives a second portion of said input optical signal; and an optical dispersion element configured to produce different delays in optical signals at different wavelengths and coupled to at least one of said first and said second optical paths to produce a difference of about $\pi$ between a sum of phases of said first and said second modulation sidebands relative to a phase of the optical carrier at said carrier frequency in said first portion, and a sum of phases of said first and said second modulation sidebands relative to a phase of the optical carrier at said carrier frequency in said second portion.

2. The device as in claim 1, further comprising a polarization element coupled to at least one of said first and said second optical paths and operable to make a polarization of light at said output terminal in said first optical path substantially orthogonal to a polarization of light at said output terminal of said second optical path.

3. The device as in claim 1, wherein said first and said second optical paths have different path lengths to produce a relative phase shift of about $\pi/2$.

4. The device as in claim 1, further comprising an optical delay element coupled to one of said first and said second optical paths.

5. The device as in claim 1, further comprising an optical attenuator coupled to one of said first and said second optical paths to substantially equalize a power of light at said output terminal in said first optical path and a power of light at said output terminal in said second optical path.

6. The device as in claim 1, where in said optical dispersion element is operable to produce different dispersions at different wavelengths and is operable to tune said dispersions in response to a control signal.

7. The device as in claim 6, wherein said optical dispersion element includes a tunable nonlinearly-chirped fiber Bragg grating.

8. A device, comprising:

an optical input port, receiving an input optical signal at an optical carrier frequency that is modulated to have a first modulation sideband and a second modulation sideband at different modulation frequencies;

a first optical path and a second optical path coupled to said input port to receive a first portion of said input optical signal as a first optical signal and a second portion of said input optical signal as a second optical signal, respectively, wherein said first and said second optical paths have different path lengths to produce a relative phase shift of about $\pi/2$;

an optical output port coupled to said first and said second optical paths to receive and combine said first and said second optical signals to produce an output optical signal;

an optical dispersion element configured to produce different delays in optical signals at different wavelengths and coupled to interact with at least one of said first and said second optical signals to produce a difference of about $\pi$ between a sum of phases of said first and said second modulation sidebands relative to a phase of the optical carrier at said carrier frequency in said first optical signal, and a sum of phases of said first and said second modulation sidebands relative to a phase of the optical carrier at said carrier frequency in said second optical signal, at said output optical port; and a polarization element coupled to at least one of said first and said second optical paths and operable to make a polarization of said first optical signal substantially orthogonal to a polarization of said second optical signal at said optical output port.

9. The device as in claim 8, further comprising an optical delay element coupled to one of said first and said second optical paths.

10. The device as in claim 8, further comprising an optical attenuator coupled to one of said first and said second optical paths to substantially equalize a power of light in said first optical path and a power of light in said second optical path at said output port.

11. The device as in claim 8, wherein said optical dispersion element is operable to produce different dispersions at different wavelengths and is operable to tune said dispersions in response to a control signal.

12. The device as in claim 11, wherein said optical dispersion element includes a tunable nonlinearly-chirped fiber Bragg grating.

13. The device as in claim 12, further comprising a fiber stretcher coupled to control said fiber Bragg grating.

14. The device as in claim 12, further comprising an optical coupling element disposed to couple light from said first optical path into said fiber Bragg grating and to couple reflected light from said fiber Bragg grating back into said first optical path, wherein said fiber Bragg grating has a first end coupled to receive said first optical signal to change a delay between each modulation sideband and the optical carrier.

15. The device as in claim 14, further comprising another optical coupling element disposed to couple light from said second optical path into a second end in said fiber Bragg grating opposing said first end and to couple reflected light from said fiber Bragg grating back into said second optical path.

16. A system, comprising:

a fiber network; and at least one power fading compensator disposed in an optical link in said fiber network to compensate for a distance-dependent power fading in an optical signal at an optical carrier frequency that is modulated to have a first modulation sideband and a second modulation sideband, wherein said power fading compensator includes:

a first optical path having an input terminal and an output terminal, said input terminal receiving a first portion of said optical signal;

a second optical path having an input terminal and an output terminal that are coupled to said input and said output terminals of said first optical path, respectively, wherein said second optical path receives a second portion of said optical signal; and an optical dispersion element configured to produce different delays in optical signals at different wavelengths and coupled to at least one of said first and said second optical paths to produce a difference of about $\pi$ between a sum of phases of said first and said second modulation sidebands relative to a phase of the optical carrier at said carrier frequency in said first portion, and a sum of phases of said first and said second modulation sidebands relative to a phase of the optical carrier at said carrier frequency in said second portion.

17. The system as in claim 16, wherein said optical dispersion element includes a nonlinearly-chirped fiber Bragg grating.

18. A method, comprising:

optically splitting an optical signal into a first optical signal in a first optical path and a second optical signal in a second optical path, wherein the optical signal is at an optical carrier frequency and is modulated to have a first modulation sideband and a second modulation sideband; and controlling dispersion in at least one of the first and the second optical paths to produce a difference of about $\pi$ between a sum of phases of the first and the second modulation sidebands relative to a phase of the optical carrier at the carrier frequency in the first optical signal, and a sum of phases of the first and the second modulation sidebands relative to a phase of the optical carrier in the second optical signal.

19. The method as in claim 18, further comprising:

making a polarization of the first optical signal to be substantially orthogonal to a polarization of the second optical signal;

setting lengths of the first and second optical paths to produce a phase difference of $\pi/2$; and combining the first and second optical signals to produce an output signal.

* * * * *